(12) United States Patent
Muthiah et al.

(10) Patent No.: US 12,461,151 B2
(45) Date of Patent: Nov. 4, 2025

(54) METHOD AND SYSTEM FOR TESTING BLOCKS WITHIN DEVICE UNDER TEST (DUT) USING RECONFIGURABLE TEST LOGIC

(71) Applicant: HCL America Inc., Sunnyvale, CA (US)

(72) Inventors: Manickam Muthiah, Shrewsbury, MA (US); Karthikeyan Keelapandal Sundaram, Chennai (IN); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 0 days.

(21) Appl. No.: 18/209,534

(22) Filed: Jun. 14, 2023

(65) Prior Publication Data

US 2024/0418778 A1 Dec. 19, 2024

(51) Int. Cl.
*G01R 31/319* (2006.01)
*G01R 31/3183* (2006.01)

(52) U.S. Cl.
CPC .......... *G01R 31/31917* (2013.01); *G01R 31/318314* (2013.01); *G01R 31/31908* (2013.01)

(58) Field of Classification Search
CPC ...... G01R 31/31908; G01R 31/318314; G01R 31/31917
See application file for complete search history.

(56) References Cited

U.S. PATENT DOCUMENTS

| | | | |
|---|---|---|---|
| 5,936,976 A * | 8/1999 | Story | G11C 29/18 714/724 |
| 6,560,740 B1 * | 5/2003 | Zuraski, Jr. | G01R 31/3187 714/733 |
| 6,686,759 B1 * | 2/2004 | Swamy | G01R 31/318558 324/76.63 |
| 7,134,059 B2 * | 11/2006 | Jeon | G11C 7/1078 714/724 |
| 7,308,608 B1 | 12/2007 | Pleis et al. | |

(Continued)

FOREIGN PATENT DOCUMENTS

| | | |
|---|---|---|
| CN | 112703409 A | 4/2021 |
| WO | 2012003790 A1 | 1/2012 |

OTHER PUBLICATIONS

Design under test (DUT) for Verification Engineer; VerifSudha Technologies Pvt. Ltd.; Jul. 22, 2016.

*Primary Examiner* — Steve N Nguyen
(74) *Attorney, Agent, or Firm* — Kendal M. Sheets (57) ABSTRACT

A method for simultaneously testing multiple Device Under Test (DUT) internal blocks is disclosed. The method includes receiving by a reconfigurable internal buffer of a DUT, an input stimulus corresponding to at least one of a plurality of DUT internal blocks; selecting, via a control register, one or more DUT internal blocks from the plurality of DUT internal blocks to perform testing based on the input stimulus. The method to select the one or more DUT internal blocks includes enabling control bits of at least one multiplexer associated with the one or more DUT internal blocks. The method includes sending, by the reconfigurable internal buffer, the input stimulus corresponding to each of the one or more DUT internal blocks; testing the one or more DUT internal blocks based on the corresponding input stimulus; and generating, by each of the one or more DUT internal blocks, a corresponding output.

19 Claims, 6 Drawing Sheets

(56) References Cited

U.S. PATENT DOCUMENTS

| | | | |
|---|---|---|---|
| 7,802,157 B2* | 9/2010 | Pekny | G01R 31/31701 714/724 |
| 8,838,406 B2 | 9/2014 | Rivoir | |
| 9,135,132 B2 | 9/2015 | Han | |
| 2003/0057990 A1* | 3/2003 | West | G01R 31/31924 324/750.01 |
| 2007/0266288 A1* | 11/2007 | Volkerink | G01R 31/31907 714/738 |
| 2007/0300118 A1* | 12/2007 | Reak | G01R 31/31908 714/742 |
| 2008/0082886 A1* | 4/2008 | Rasmussen | G01R 31/31924 714/738 |
| 2009/0112548 A1* | 4/2009 | Conner | G06F 11/261 714/25 |
| 2017/0293544 A1* | 10/2017 | Katayama | G06F 11/2733 |

\* cited by examiner

| Register Name 702A | Register Address 704A | Data 706A |
|---|---|---|
| Address Register 702-1A | 0x1000 0000 | 0x0000-0x00FF (DUT Internal Block A range)<br>0x0100-0x01FF (DUT Internal Block B range)<br>0x0200-0x02FF (DUT Internal Block C range) |
| Data Register 702-2A | 0x1000 0001 | Data for Reconfigurable Internal Buffer |
| Control Register 702-3A | 0x1000 0002 | 0x0000_0007 (Enable for DUT Internal Block A bit 0, DUT Internal Block B bit 1, and DUT Internal Block C bit 2) |

METHOD AND SYSTEM FOR TESTING BLOCKS WITHIN DEVICE UNDER TEST (DUT) USING RECONFIGURABLE TEST LOGIC

TECHNICAL FIELD

Generally, the invention relates to functional simulation validation or verification. More specifically, the invention relates to method and system for simultaneously testing multiple DUT internal blocks within Device Under Test (DUT) using reconfigurable test logic.

BACKGROUND

Functional simulation validation or verification of a device under test (DUT) or a system under test (SUT) involves simulating the behavior of the DUT at a functional level, using software tools and test vectors, in order to verify that the device behaves according to the desired specifications. The functional simulation validation process typically involves creating a testbench, which is a program or set of scripts that generates input stimuli for the DUT and checks the output responses. The testbench provides a way to exercise the functionality of the DUT and compare actual results with expected results. Moreover, functional simulation validation is considered as an important part of the design verification process for electronic systems, such as, integrated circuits (ICs), microprocessors, and other digital logic circuits, as it can help detect errors and bugs early, before the device is fabricated or deployed.

In traditional test environment, functional simulation validation testbench components typically incudes monitor, driver, and scoreboard as main testbench components. Further, random input stimulus is passed to the interface to drive the corresponding DUT internal block and resultant data is compared against the expected output in the scoreboard. In other words, in the traditional functional validation environment, the input stimulus is driven at the DUT input interfaces at the DUT boundary and output is collected at the DUT output interfaces. This output collected at the DUT output interfaces is used for performing one or more checks (such as data integrity check) corresponding to the DUT. Further, using the traditional functional validation environment, the generation of the input stimulus for all corner cases (i.e., difficult to hit scenarios) of the DUT might be difficult, and time consuming. This is because, these corner cases are often uncommon or unlikely scenarios that require creation of specific test cases and execution of these test cases. Moreover, validation of these corner cases using the traditional functional validation environment may be inflexible and may require higher validation cost. This is because the traditional functional validation environment may not quickly adapt to changing corner case requirements or specifications and require additional software and hardware tools as well as specialized expertise.

Therefore, there is a need for implementing an efficient and reliable technique for simultaneously testing multiple internal blocks of a DUT.

SUMMARY OF INVENTION

In one embodiment, a method for simultaneously testing multiple Device Under Test (DUT) internal blocks is disclosed. The method may include receiving, by a reconfigurable internal buffer of a DUT, an input stimulus corresponding to at least one of a plurality of DUT internal blocks within the DUT via a set of configuration registers. It should be noted that the input stimulus may correspond to a test case. The method may include selecting, via a control register, one or more DUT internal blocks from the plurality of DUT internal blocks to perform testing based on the input stimulus. To select the one or more DUT internal blocks, the method may include enabling control bits of at least one multiplexer associated with the one or more DUT internal blocks. The method may include sending, by the reconfigurable internal buffer, the input stimulus corresponding to each of the one or more DUT internal blocks. The method may include testing the one or more DUT internal blocks based on the corresponding input stimulus. The method may include generating, by each of the one or more DUT internal blocks, a corresponding output in response to testing.

In another embodiment, a system for simultaneously testing multiple Device Under Test (DUT) internal blocks is disclosed. The system includes a processor and a memory communicatively coupled to the processor. The memory may store processor-executable instructions, which, on execution, may cause the processor to receive, by a reconfigurable internal buffer of a DUT, an input stimulus corresponding to at least one of a plurality of DUT internal blocks within the DUT via a set of configuration registers. It should be noted that the input stimulus may correspond to a test case. The processor-executable instructions, on execution, may further cause the processor to select, via a control register, one or more DUT internal blocks from the plurality of DUT internal blocks to perform testing based on the input stimulus. To select the one or more DUT internal blocks, the processor-executable instructions, on execution, may further cause the processor to enable control bits of at least one multiplexer associated with the one or more DUT internal blocks. The processor-executable instructions, on execution, may further cause the processor to send, by the reconfigurable internal buffer, the input stimulus corresponding to each of the one or more DUT internal blocks. The processor-executable instructions, on execution, may further cause the processor to test the one or more DUT internal blocks based on the corresponding input stimulus. The processor-executable instructions, on execution, may further cause the processor to generate, by each of the one or more DUT internal blocks, a corresponding output in response to testing.

In yet another embodiment, a non-transitory computer-readable medium storing computer-executable instruction for simultaneously testing multiple Device Under Test (DUT) internal blocks is disclosed. The stored instructions, when executed by a processor, may cause the processor to perform operations including receiving, by a reconfigurable internal buffer of a DUT, an input stimulus corresponding to at least one of a plurality of DUT internal blocks within the DUT via a set of configuration registers. It should be noted that the input stimulus may correspond to a test case. The operations may further include selecting, via a control register, one or more DUT internal blocks from the plurality of DUT internal blocks to perform testing based on the input stimulus. To select the one or more DUT internal blocks, the operations may further include enabling control bits of at least one multiplexer associated with the one or more DUT internal blocks. The operations may further include sending, by the reconfigurable internal buffer, the input stimulus corresponding to each of the one or more DUT internal blocks. The operations may further include testing the one or more DUT internal blocks based on the corresponding input stimulus. The operations may further include generating, by each of the one or more DUT internal blocks, a corresponding output in response to testing.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
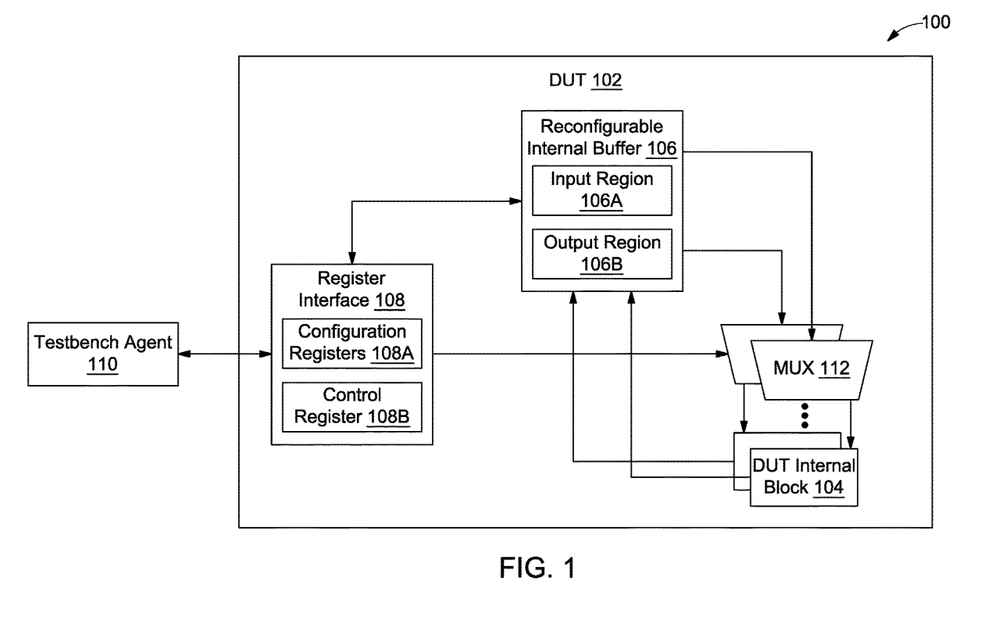
FIG. 1 illustrates a functional diagram of a system configured for simultaneously testing multiple Device Under Test (DUT) internal blocks, in accordance with an embodiment.

A functional diagram of a system 100 configured for simultaneously testing multiple Device Under Test (DUT) internal blocks is illustrated in FIG. 1. As depicted via the present FIG. 1, the system 100 may include a DUT 102. The DUT 102 may include a plurality of DUT internal blocks 104. In order to simultaneously test the plurality of DUT internal blocks 104 of the DUT 102, the DUT 102 may include a reconfigurable internal buffer 106 and a register interface 108. In some embodiment, the reconfigurable internal buffer 106 may correspond to a block Random Access Memory (RAM) or a memory into which reconfigurable content is written and read from. As will be appreciated, the reconfigurable internal buffer 106 may be configured using any normal register programming. The reconfigurable internal buffer 106 may include a pre-configured input region 106A and a pre-configured output region 106B. Further, the register interface 108 may include a set of configuration registers 108A and a control register 108B.

Initially, the set of configuration registers 108A may receive an input stimulus from a testbench agent 110. The input stimulus may correspond to a test case. Further, the testbench agent 110 may receive the input stimulus from a user (e.g., a quality assurance engineer or a tester). The user may generate the input stimulus for the plurality of DUT internal blocks 104 based on user requirement. In an embodiment, the user requirement may depend upon testing scenario corresponding to the DUT 102. In addition, the input stimulus may be one of a directed stimulus or a corner case stimulus. A method of generating the input stimulus has been further explained in detail in conjunction with FIG. 3.

Further, the set of configuration registers 108A may include an address register and a data register. The address register may be configured for storing an address of the pre-configured input region 106A or the pre-configured output region 106B. In addition, the data register may be configured to write the input stimulus to the pre-configured input region 106A of the reconfigurable internal buffer 106. Moreover, the data register may be configured to read an output from the pre-configured output region 106B of the reconfigurable internal buffer 106.

Once the set of configuration registers 108A receives the input stimulus from the testbench agent 110, the set of configuration registers 108A may be configured to write the received input stimulus to the reconfigurable internal buffer 106. In particular, the set of configuration registers 108A may write the input stimulus from the data register into the pre-configured input region 106A of the reconfigurable internal buffer 106 based on the address stored in the address register. The input stimulus may be received corresponding to at least one of the plurality of DUT internal blocks 104 present within the DUT 102. In other words, the reconfigurable internal buffer 106 may receive the input stimulus corresponding to one or more of the plurality of DUT internal blocks 104 that needs to be tested based on the user requirement.

Once the input stimulus is written into the pre-configured input region 106A, then one or more DUT internal blocks from the plurality of DUT internal blocks 104 may be selected. In an embodiment, the one or more DUT internal blocks may be selected via the control register 108B. In order to select the one or more DUT internal blocks, control bits of at least one multiplexer (MUX) 112 corresponding to the one or more DUT internal blocks 104 may be enabled via the control register. As will be appreciated, the user may select a single DUT internal block or multiple DUT internal blocks from the plurality of DUT internal blocks 104 of the DUT 102 simultaneously based on testing (or validation) requirement. Once the one or more DUT internal blocks are selected, the reconfigurable internal buffer 106 may be configured to send the input stimulus corresponding to each of the one or more DUT internal blocks based on the enabled control bits of the at least one multiplexer 112.

Upon sending the input stimulus to the one or more DUT internal blocks, the one or more DUT internal blocks may be tested based on the received input stimulus. Further, based on testing, the one or more DUT internal blocks may be configured to generate a corresponding output in response to testing. Once the output is generated by each of the one or more DUT internal blocks, each of the one or more DUT internal blocks may transmit the corresponding output to the pre-configured output region 106B of the reconfigurable internal buffer 106. Further, the output corresponding to each of the one or more DUT internal blocks may be stored in the pre-configured output region 106B of the reconfigurable internal buffer 106 for further analysis.

In an embodiment, the output stored corresponding to each of the one or more DUT internal blocks may be used by the user to verify functionality of each of the one or more DUT internal blocks based on the user requirement. In addition, the output stored corresponding to the one or more DUT internal blocks may be used by the user to establish whether the at least one test case has failed or passed. In other words, to perform further analysis, the user may retrieve the output stored corresponding to the one or more DUT internal blocks from the pre-configured output region 106B of the reconfigurable internal buffer 106. It should be noted that, the reconfigurable internal buffer 106 may be updated with a set of input stimulus for the plurality of DUT internal blocks 104 of the DUT 102 based on user requirement to perform testing. A method of verifying functionality of the one or more DUT internal blocks is further explained in detail in conjunction with FIG. 3.

Figure 2:
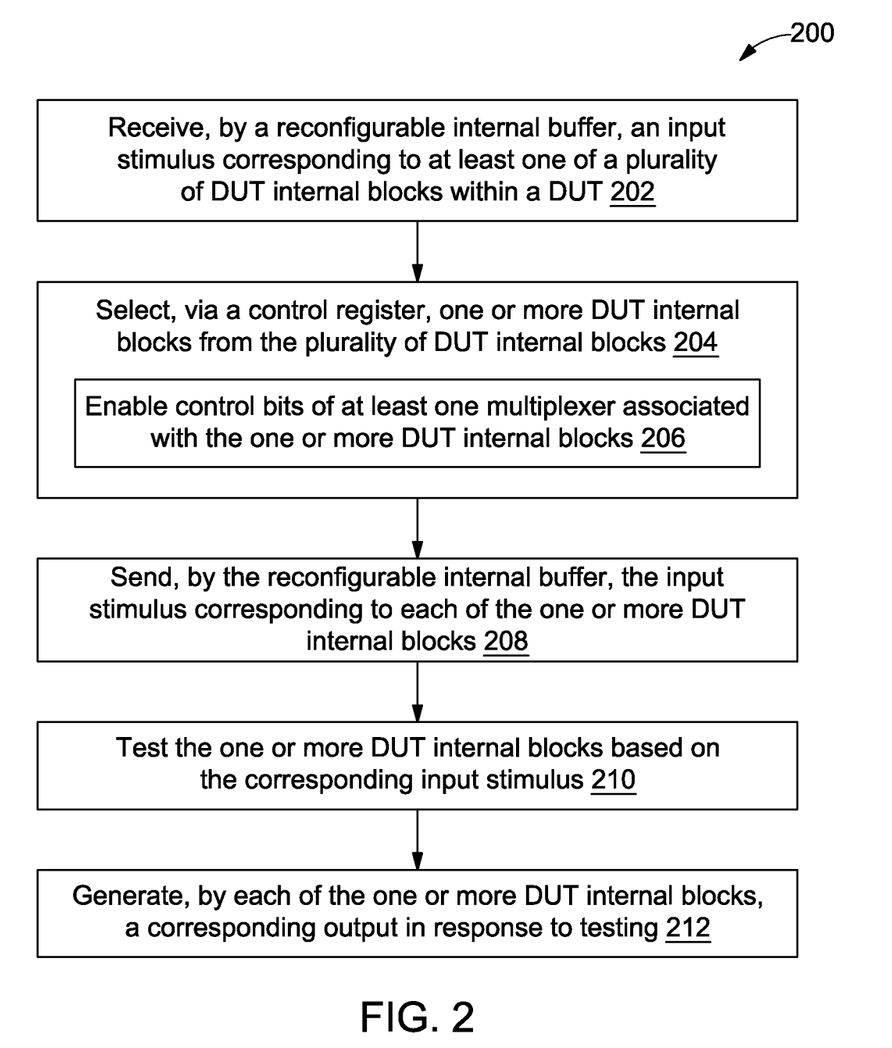
FIG. 2 illustrates a flowchart of a method for simultaneously testing a plurality of Device Under Test (DUT) internal blocks, in accordance with an embodiment.

Referring now to FIG. 2, a flowchart of a method 200 for simultaneously testing a plurality of Device Under Test (DUT) internal blocks is illustrated, in accordance with an embodiment. FIG. 2 is explained in conjunction with FIG. 1. With reference to FIG. 1, the plurality of DUT internal blocks may correspond to the plurality of DUT internal blocks 104 within the DUT 102. Initially, at step 202, an input stimulus corresponding to at least one of the plurality of DUT internal blocks within the DUT may be received. In an embodiment, the input stimulus corresponding to at least one of the plurality of DUT internal blocks may be received by a reconfigurable internal buffer (same as the reconfigurable internal buffer 106) via a set of configuration registers (same as the configuration registers 108).

It should be noted that, the reconfigurable internal buffer may include a pre-configured input region (same as the pre-configured input region 106A) and a pre-configured output region (same as the pre-configured output region 106B). In an embodiment, the input stimulus may correspond to a test case. Further, the set of configuration registers may be configured to receive the input stimulus from a testbench agent (same as the testbench agent 110). The input stimulus may be generated and provided to the testbench agent by a user (e.g., a quality assurance engineer or a tester). In other words, the user may generate the input stimulus and provide the generated input stimulus to the reconfigurable internal buffer through the set of configuration registers via the testbench agent. In an embodiment, the input stimulus may be one of a directed stimulus or a corner-case stimulus.

In order to receive the input stimulus from the set of configuration registers, the set of configuration registers may include an address register and a data register. The address register may be configured for storing an address of the pre-configured input region or the pre-configured output region of the reconfigurable internal buffer. Further, the data register may be configured for writing the input stimulus to the pre-configured input region of the reconfigurable internal buffer or reading an output from the pre-configured output region of the reconfigurable internal buffer based on the address stored in the address register. A method of loading the reconfigurable internal buffer with the input stimulus is further explained in detail in conjunction with FIG. 3.

Once the input stimulus corresponding to at least one of the plurality of DUT internal blocks is written in the pre-configured input region, then at step 204, one or more DUT internal blocks from the plurality of DUT internal blocks may be selected to perform testing. With reference to FIG. 1, the one or more DUT internal blocks may be selected via the control register 108B. In an embodiment, the testing of the one or more DUT internal blocks may be performed based on the corresponding input stimulus. Further, in order to select the one or more DUT internal blocks, at step 206, control bits of at least one multiplexer (same as the at least one multiplexer 112) associated with the one or more DUT internal blocks may be enabled.

Once the control bits of at least one multiplexer associated with the one or more DUT internal blocks to be tested are enabled, then at step 208, the input stimulus corresponding to each of the one or more DUT internal blocks may be sent to the one or more DUT internal blocks. In an embodiment, the input stimulus may be sent to the one or more DUT internal blocks by the reconfigurable internal buffer. Upon receiving the input stimulus from the reconfigurable internal buffer, at step 210, the one or more DUT internal blocks may be tested based on the corresponding input stimulus. Further, at step 212, each of the one or more DUT internal blocks may generate a corresponding output based on the testing of the one or more DUT internal blocks using the input stimulus. In some embodiment, the control register may enable control bits of a multiplexer associated with a DUT internal block from the one or more DUT internal blocks to receive the output generated by a preceding DUT internal block as an input stimulus. In other words, a successive DUT internal block of the one or more DUT internal blocks may be tested based on the output generated by the preceding DUT internal block in response to testing. This is further explained in detail in reference to FIG. 6.

Once the corresponding output is generated by each of the one or more DUT internal blocks, then each of the one or more DUT internal blocks may transmit the corresponding output to the pre-configured output region of the reconfigurable internal buffer. Further, the output received from each of the one or more DUT internal blocks may be stored in the pre-configured output region of the reconfigurable internal buffer. In an embodiment, the output received corresponding to the one or more DUT internal blocks may be used by the user to verify functionality of the one or more DUT internal blocks and to establish whether the test case corresponding to each of the one or more DUT internal blocks has passed or failed. A method of verifying functionality of the one or more DUT internal blocks has been further explained in detail in conjunction with FIG. 5.

Figure 3:
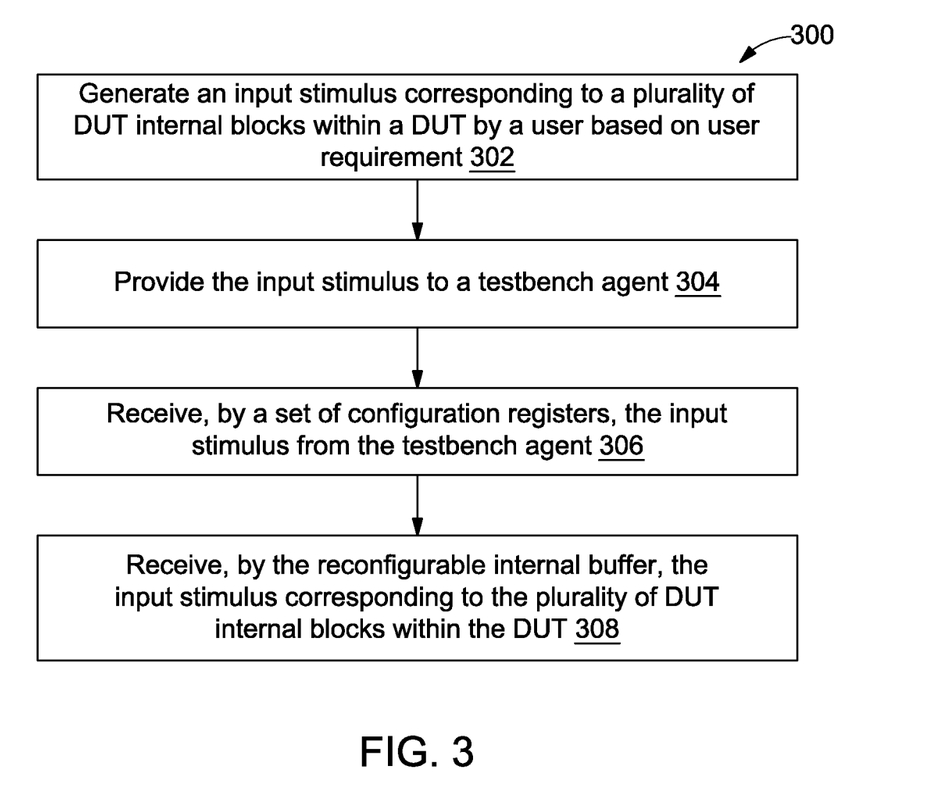
FIG. 3 illustrates a flowchart of a method for loading a reconfigurable internal buffer with an input stimulus for each of a plurality of DUT internal blocks, in accordance with an embodiment.

Referring now to FIG. 3, a flowchart of a method 300 for loading a reconfigurable internal buffer with an input stimulus for each of a plurality of DUT internal blocks is illustrated, in accordance with an embodiment. Initially, at step 302, the input stimulus may be generated by the user (e.g., a quality assurance engineer or a tester). In an embodiment, the input stimulus may correspond to the test case. Further, the user may generate the input stimulus based on his requirements of testing a DUT (same as the DUT 102). Moreover, the user may generate the input stimulus for a plurality of DUT internal blocks (same as the plurality of DUT internal blocks 104) of the DUT that needs to be tested. As will be appreciated, the user may generate the input stimulus to validate functionality of the one or more DUT internal blocks of the plurality of DUT internal blocks. It should be noted that, the user may generate the input stimulus for validating functionality of one DUT internal block or more than one DUT internal block from the plurality of DUT internal blocks based on his requirement with respect to testing.

Once the input stimulus is generated by the user, at step 304, the user may provide the input stimulus to a testbench agent (same as the testbench agent 110). In some embodiment, the testbench agent may also be referred to as a test environment. Further, at step 306, a set of configuration registers (same as the set of configuration registers 108A) may receive the input stimulus corresponding to the plurality of DUT internal blocks from the testbench agent. Upon receiving the input stimulus corresponding to the plurality of DUT internal blocks of the DUT, the set of configuration registers may be configured to send the input stimulus to a reconfigurable internal buffer (same as the reconfigurable internal buffer 106).

Further, at step 308, the reconfigurable internal buffer may be configured to receive the input stimulus from the set of configuration registers. In an embodiment, in order to receive the input stimulus from the set of configuration registers, the set of configuration registers may include an address register and a data register. The address register may be configured for storing the address of the pre-configured input region (same as the pre-configured input region 106A) of the reconfigurable internal buffer. Further, the data register may be configured to write the input stimulus generated corresponding to the plurality of DUT internal blocks to the pre-configured input region of the reconfigurable internal buffer based on the address stored in the address register. In an embodiment, to write the input stimulus into the pre-configured input region of the reconfigurable internal buffer, the input stimulus and the address of the pre-configured input region may be loaded in the data register and the address register respectively.

Upon receiving the input stimulus from the set of configuration registers, the reconfigurable internal buffer may store the input stimulus in the pre-configured input region. The stored input stimulus may be used for testing the plurality of DUT internal blocks of the DUT. In some embodiment, the user may update the reconfigurable internal buffer of the DUT with a set of input stimulus for each of the plurality of DUT internal blocks based on his requirement. In other words, the user may generate new set of input stimulus corresponding to the plurality of DUT internal blocks based on associated testing scenario. As will be appreciated, since the reconfigurable internal buffer may be used across all DUT internal blocks (i.e., the plurality of DUT internal blocks), the user may be able to decide format of the input stimulus to be loaded. In other words, for testing each DUT internal block, the reconfigurable internal buffer may be re-configured with different set of input stimulus appropriately.

Figure 4:
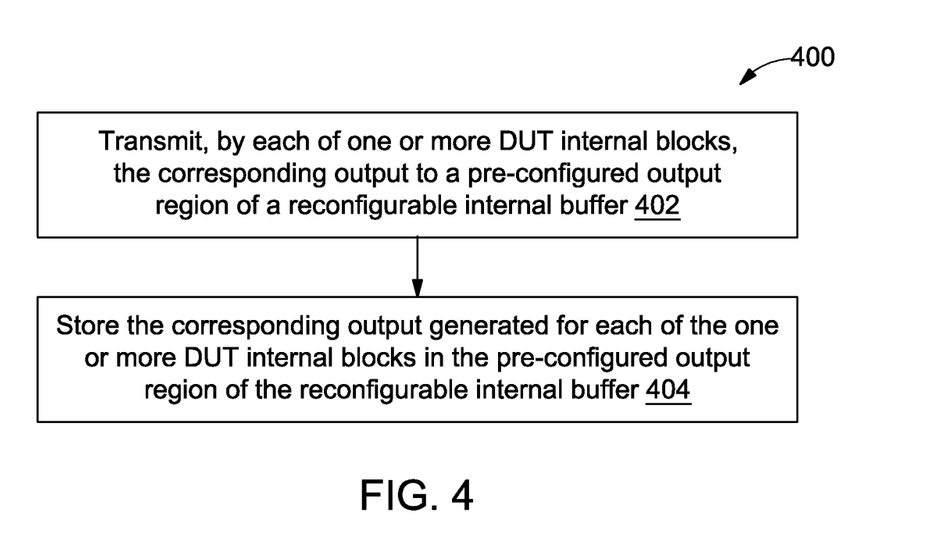
FIG. 4 illustrates a flowchart of a method of storing an output generated by one or more DUT internal blocks, in accordance with an embodiment.

Referring now to FIG. 4, a flowchart of a method 400 of storing an output generated by one or more DUT internal blocks is illustrated, in accordance with an embodiment. With reference to FIG. 2, as mentioned via the step 212, upon testing the one or more DUT internal blocks based on the corresponding input stimulus, each of the one or more DUT internal blocks may generate the corresponding output. Once the output is generated by each of the one or more DUT internal blocks, at step 402, the generated output may be transmitted to a pre-configured output region (same as the pre-configured output region 106B) of a reconfigurable internal buffer (same as the reconfigurable internal buffer 106).

Further, at step 404, the output received from each of the one or more DUT internal blocks may be stored in the pre-configured output region of the reconfigurable internal buffer. With reference to FIG. 1, as will be appreciated, the reconfigurable internal buffer may be fragmented into two portions, i.e., the pre-configured input region and the pre-configured output region. As mentioned in FIG. 3, the pre-configured input region may be configured for storing the input stimulus corresponding to the plurality of DUT internal blocks. In addition, the pre-configured output region may be configured for storing the output generated by each of the one or more DUT internal blocks in response to testing the one or more DUT internal blocks.

Figure 5:
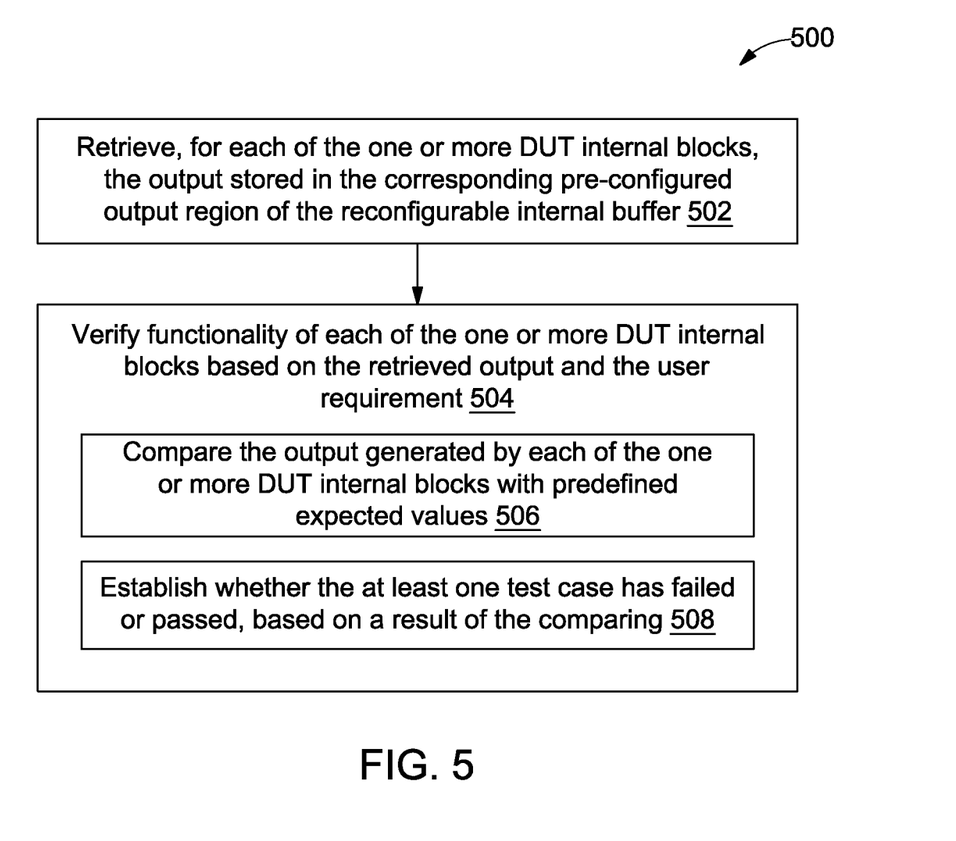
FIG. 5 illustrates a flowchart of a method for verifying functionality of one or more DUT internal blocks, in accordance with an embodiment.

Referring now to FIG. 5, a flowchart of a method 500 for verifying functionality of one or more DUT internal blocks is illustrated, in accordance with an embodiment. With reference to FIG. 4, as mentioned via steps 402 and 404, once the output is received and stored in the pre-configured output region, then at step 502, the output corresponding to the one or more DUT internal blocks may be retrieved. In an embodiment, the user may retrieve the output based on his requirement. In addition, the output may be retrieved using a set of configuration registers (same as the set of configuration registers 108A). In other words, the user may retrieve the output via the data register based on the address of the pre-configured output region stored in the address register. In an embodiment, the data register may be configured for reading the output associated with each of the one or more DUT internal blocks from the pre-configured output region of the reconfigurable internal buffer using the address of the preconfigured output region stored in the address register.

Upon retrieving the output corresponding to each of the one or more DUT internal blocks, at step 504, functionality of each of the one or more DUT internal blocks may be verified. In an embodiment, the functionality of each of the one or more DUT internal blocks may be verified based on the retrieved output and the user requirement. In some embodiment, the user may verify the functionality of each of the one or more DUT internal blocks either manually or by using a pre-configured computing device. In order to verify the functionality of each of the one or more DUT internal blocks, at step 506, the output generated by each of the one or more DUT internal blocks may be compared with pre-defined expected value.

In an embodiment, the predefined expected value may correspond to an output value that the user might be expecting to be generated by each of the one or more DUT internal blocks in response to testing. In other words, the user may compare the output generated for each of the one or more DUT internal blocks with the respective predefined expected value associated with each of the one or more DUT internal blocks. Further, based on a result of comparing, at step 508, an establishment may be made for the test case (i.e., the input stimulus). In an embodiment, the establishment may be made to determine whether the at least one test case corresponding to each of the one or more DUT internal blocks have failed or passed.

By way of example, based on the testing of a DUT internal block corresponding to the input stimulus, the output generated for the DUT internal block may be compared with the respective predefined expected value. Further, based on comparison, if the generated output matches the predefined expected value, then the input stimulus (i.e., the test case) may be determined as passed test case. Furthermore, based on the comparison, when the output generated by the DUT internal block in response to the testing of the DUT internal block corresponding to the input stimulus does not match the respective predefined expected value, then the test case associated with the DUT internal block is determined to be a failed test case.

Figure 6:
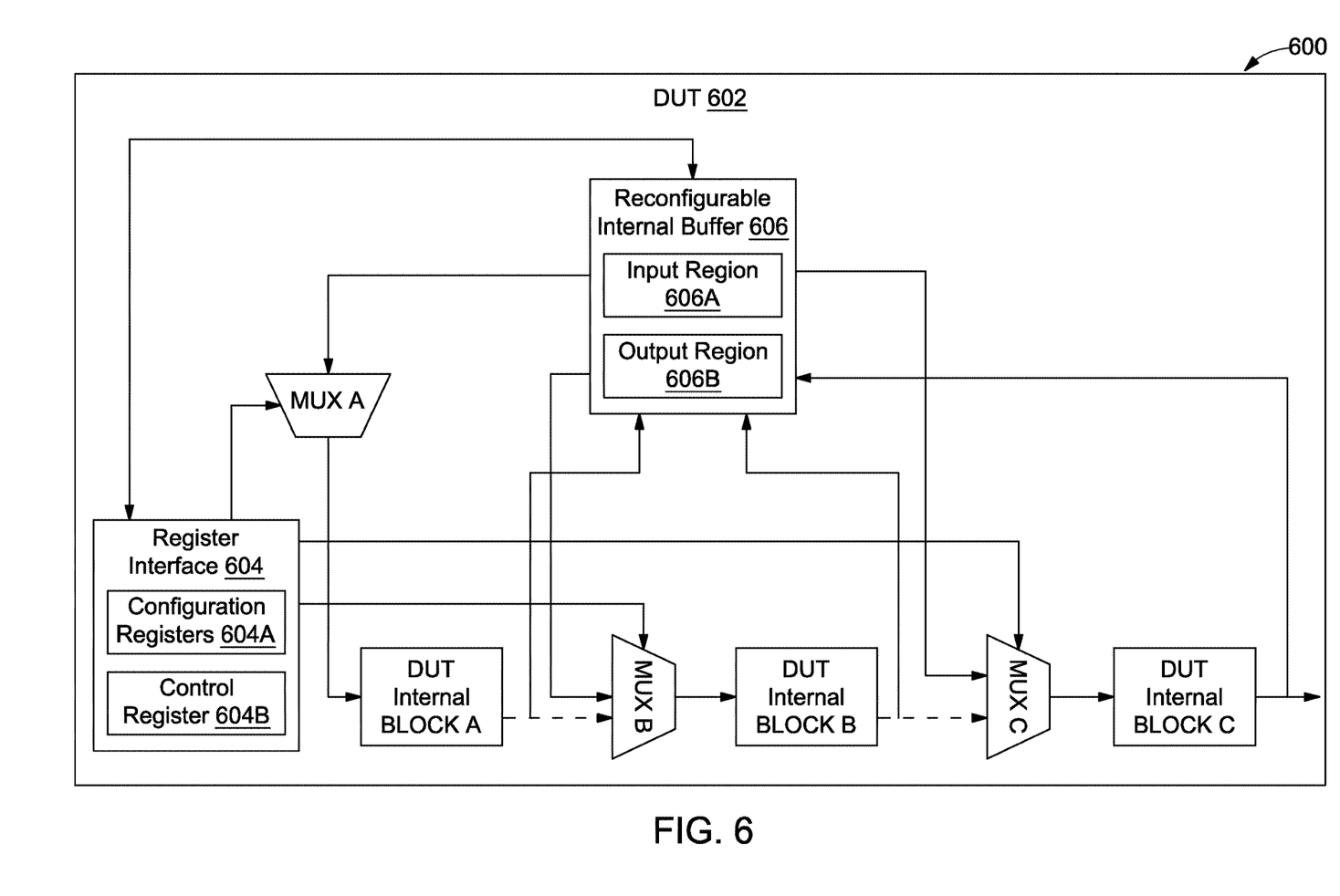
FIG. 6 illustrates an exemplary test environment for simultaneously testing multiple internal blocks of a DUT using reconfigurable test logic, in accordance with an embodiment.

Referring now to FIG. 6, an exemplary testing environment 600 for simultaneously testing multiple Device Under Test (DUT) internal blocks of a DUT 602 (same as the DUT 102) using reconfigurable test logic is illustrated, in accordance with an embodiment. As depicted via the present FIG. 6, a plurality of DUT internal blocks (same as the plurality of DUT internal block 104) of the DUT 602 may correspond to 'DUT internal block A', 'DUT internal block B', and 'DUT internal block C'. Initially, a register interface 604 (same as the register interface 108) may receive an input stimulus corresponding to the DUT internal block A, DUT internal block B, and DUT internal block C, from a testbench agent (same as the testbench agent 110). The input stimulus may be generated and provided to the testbench agent by a user (e.g., a quality assurance engineer or a tester). The register interface 604 may include a set of configuration registers 604A (same as the set of configuration registers 108A) and a control register 604B (same as the control register 108B). The set of configuration registers 604A may include an address register and a data register. An exemplary representation of address of the set of configuration registers 604A and the control register 604B is depicted via FIG. 7A.

Upon receiving the input stimulus from the user, the set of configuration registers 604A may be configured to transmit the input stimulus to a reconfigurable internal buffer 606 (same as the reconfigurable internal buffer 106). In an embodiment, the reconfigurable internal buffer 606 may include a pre-configured input region 606A (same as the pre-configured input region 106A) and a pre-configured output region 606B (same as the pre-configured output region 106B). In particular, the set of configuration registers 604A may transmit the input stimulus to the pre-configured input region 606A of the reconfigurable internal buffer 606. In order to transmit the input stimulus to the pre-configured input region 606A, the address register may store the address of the pre-configured input region 606A to locate the pre-configured input region 606A of the reconfigurable internal buffer 606.

Upon locating the pre-configured input region 606A, the data register may be configured to write the input stimulus received corresponding to the DUT internal block A, DUT internal block B, and DUT internal block C, to the pre-configured input region 606A of the reconfigurable internal buffer 606. Upon receiving the input stimulus from the set of configuration registers 606A, the control register 606B may be configured to select at least one of the DUT internal block A, the DUT internal block B, and the DUT internal block C to perform testing based on the received input stimulus. In order to select the at least one of the DUT internal block A, DUT internal block B, and the DUT internal block C, the control register 604B may enable control bits of at least one multiplexer associated with the at least one of the DUT internal block A, the DUT internal block B, and the DUT internal block C. As depicted, a multiplexer, i.e., MUX A may be associated with the DUT internal block A. A multiplexer, i.e., MUX B may be associated with the DUT internal block B. In addition, a multiplexer, i.e., MUX C may be associated with the DUT internal block C.

By way of an example, consider a scenario where the user may be interested in testing functionality of each DUT internal block, i.e., the DUT internal block A, the DUT internal block B and the DUT internal block C as depicted via the present FIG. 6. In this case, upon receiving the input stimulus corresponding to the DUT internal block A, the DUT internal block B, and the DUT internal block C, the user may configure the control register 604B to select the DUT internal block A, the DUT internal block B, and the DUT internal block C. In order to select the DUT internal block A, the DUT internal block B, and the DUT internal block C, the control register 604B may select the MUX A, the MUX B, and the MUX C by enabling control bits of the MUX A, the MUX B, and the MUX C respectively, as depicted via FIG. 7B.

In one embodiment, upon selecting the MUX A, the MUX B, and the MUX C, the input stimulus corresponding to the DUT internal block A, the DUT internal block B, and the DUT internal block C may be sent from the pre-configured input region 606A of the reconfigurable internal buffer 606 to the DUT internal block A, the DUT internal block B, and the DUT internal block C, respectively. Further, upon receiving the corresponding input stimulus, the DUT internal block A, the DUT internal block B, and the DUT internal block C may perform testing based on the received input stimulus. Further, based on the testing performed, the DUT internal block A, the DUT internal block B, and the DUT internal block C may generate a corresponding output.

In another embodiment, as depicted via dash lines in present FIG. 6, the output generated by a DUT internal block (for example: the DUT internal block A) may be used as the input stimulus for testing another DUT internal block (for example: the DUT internal block B). In this case, the control register 604B may selectively enable the MUX B associated with the DUT internal block B to receive the output generated by a preceding DUT internal block, i.e., the DUT internal block A, as the input stimulus, based on which the DUT internal block B may be tested. Further, the DUT internal block B may generate the output in response to testing. The output generated by the DUT internal block may be provided as the input stimulus to the DUT internal block C based on which the DUT internal block C may be tested. In an embodiment, the output generated by the DUT internal block B may be provided as the input stimulus to the DUT internal block C by appropriately selecting control bits of the MUX C via the control register 604B. Once the control bits of the MUX C are enabled, the DUT internal block C may receive the output of the DUT internal block B as the input stimulus. The output generated by the DUT internal block A, the DUT internal block B, and the DUT internal block C may be transmitted to the pre-configured output region 606B of the reconfigurable internal buffer 606. Further, the pre-configured output region 606B may be configured to store the output received from each of the DUT internal block A, the DUT internal block B, and the DUT internal block C for future reference. As will be appreciated, the user may selectively test one DUT internal block or all DUT internal blocks (i.e., the DUT internal block A, the DUT internal block B, and the DUT internal block C) based on his requirement.

Further, the output stored corresponding to the DUT internal block A, the DUT internal block B, and the DUT internal block C may be used by the user to verify functionality of each of the DUT internal block A, the DUT internal block B, and the DUT internal block C. The method of verifying the functionality of each of the plurality of DUT internal blocks has been already explained in detail in reference to FIG. 5. Further, in some embodiment, the user may update the pre-configured input region 606A of the reconfigurable internal buffer 606 with new set of input stimulus corresponding to the DUT internal block A, the DUT internal block B, and the DUT internal block C based on his requirements with respect to the testing.

Figure 7A:
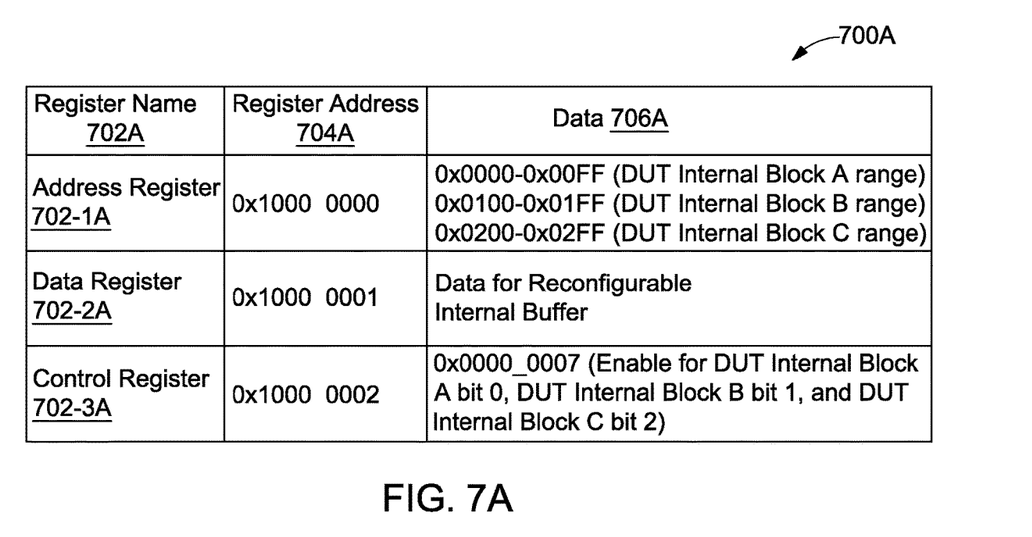
FIGS. 7A and 7B illustrate exemplary tables depicting a set of configuration registers and a control register, and enable control bits, in accordance with an embodiment.
Figure 7B:
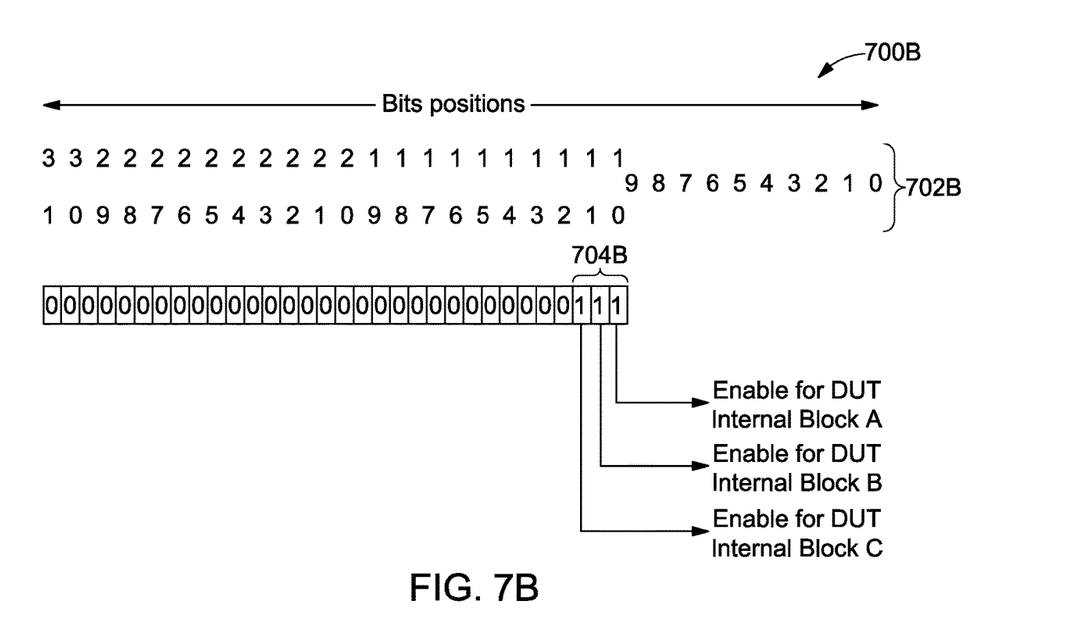

Referring now to FIGS. 7A and 7B, exemplary tables depicting a set of configuration registers (same as the set of configuration registers 604A) and a control register (same as the control register 604B), and enable control bits is illustrated, in accordance with an embodiment. FIGS. 7A and 7B is explained in conjunction with FIG. 6. FIG. 7A represents a table 700A depicting the set of configuration registers 604A and the control register 604B. As will be appreciated, the set of configuration registers 604A may include the address register and the data register. In table 700A, each row of first column 702A represents name of registers, i.e., an address register 702-1A, a data register 702-2A, and a control register 702-3A (same as the control register 604B). Further, each row of second column 704A includes address details corresponding to each register mentioned in first column 702A.

By way of an example, the address of the address register 702-1A may be '0x1000_0000'. The address stored in the address register may be used to locate the pre-configured input region 606A or the pre-configured output region 606B of the reconfigurable internal buffer 606. Similarly, the address of the data register 702-2A may be '0x1000_0001'. This register may be used to write the input stimulus (i.e., data or test case) to the pre-configured input region 606A of the reconfigurable internal buffer 606. In addition, the address of the control register 702-3A may be '0x1000_0002'. This register may be used to selectively enable or disable the transfer of the input stimulus from the reconfigurable internal buffer 606 to the DUT internal block A, the DUT internal block B, and the DUT internal block C for testing.

Further, each row of third column 706A may represent data (information) associated with each register. By way of an example, as depicted, data associated with the address register may include '0x0000-0x00FF (the DUT internal block A range), 0x0100-0x01FF (the DUT internal block B range), and 0x0200-0x02FF (the DUT internal block C range). Similarly, data associated with the data register may include data (i.e., the input stimulus or the output) for the pre-configured input region 606A or the pre-configured output region 606B of the reconfigurable internal buffer 606. In addition, the control register 702-3A may include control signals for enabling each of the DUT internal block A, the DUT internal block B, and the DUT internal block C.

As depicted, the control signals may be '0x0000_0007' (Enable for the DUT internal block A bit 0, Enable for the DUT internal block B bit 1, and Enable for the DUT internal block C bit 2). Each register, i.e., the address register 702-1A, the data register 702-2A, the control register 702-3A may be implemented as read/write register. The control signal enabled for the DUT internal block A, the DUT internal block B, and the DUT internal block C is depicted via a table 700B of FIG. 7B. In the table 700B, positioning of control bits are depicted at 702B. Further, each of the control bits enabled for the DUT internal block A, the DUT internal block B, and the DUT internal block C is represented as '1' as highlighted via 704B.

Various embodiments provide method and system for simultaneously testing multiple Device Under Test (DUT) internal blocks. The disclosed method and system may receive, by a reconfigurable internal buffer of a DUT, an input stimulus corresponding to at least one of a plurality of DUT internal blocks within the DUT via a set of configuration registers. The input stimulus may correspond to a test case. Further, the disclosed method and system may select, via a control register, one or more DUT internal blocks from the plurality of DUT internal blocks to perform testing based on the input stimulus. To select the one or more DUT internal blocks, the disclosed method and system may enable control bits of at least one multiplexer associated with the one or more DUT internal blocks. Moreover, the disclosed method and system may send, by the reconfigurable internal buffer, the input stimulus corresponding to each of the one or more DUT internal blocks. Further, the disclosed method and system may test the one or more DUT internal blocks based on the corresponding input stimulus. Thereafter, the disclosed method and system may generate, by each of the one or more DUT internal blocks, a corresponding output in response to testing.

The disclosed method and system may provide some advantages like, the disclosed method and the system may be methodology independent and hence may be used across any of an existing industry standard verification methodology. Further, the disclosed method and the system may enable user to verify DUT internal blocks for corner-cases without any external interface and complex testbench environment. Moreover, using the disclosed method and system, the verification of the DUT internal blocks for the corner cases may be done using minimal manual efforts. Further, the disclosed method and system may use reconfigurable test logic for test case (i.e., the input stimulus) to check internal logics of each of the DUT internal blocks. Further, using this reconfigurable test logic for the test case, multiple DUT internal blocks may be tested at once. In addition, the disclosed method and system may provide user a set of abilities, such as, independently enable/disable, and check/validate internal functionality of the DUT internal blocks, send directed stimulus or corner-case stimulus which cannot be easily supplied to each DUT internal block in the traditional test environment. Lastly, the disclosed method and system may be applicable for both pre-silicon validation or verification and post-silicon validation.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for simultaneously testing multiple Device Under Test (DUT) internal blocks, the method comprising:
   receiving, by a reconfigurable internal buffer of a DUT, an input stimulus corresponding to at least one of a plurality of DUT internal blocks within the DUT via a set of configuration registers, wherein the input stimulus corresponds to a test case;
   selecting, via a control register, one or more DUT internal blocks from the plurality of DUT internal blocks to perform testing based on the input stimulus, wherein selecting the one or more DUT internal blocks comprises:
      enabling via control bits, at least one multiplexer associated with the one or more DUT internal blocks;
   sending, by the reconfigurable internal buffer and selectively routing, via the control register through at least one multiplexer, to a DUT internal block of the one or more DUT internal blocks, at least one of:
      the input stimulus; or
      a DUT output generated by a preceding DUT internal block;
   testing the one or more DUT internal blocks based on the corresponding input stimulus; and
   generating, by each of the one or more DUT internal blocks, a corresponding output in response to testing.

2. The method of claim 1, further comprising receiving, by the set of configuration registers, the input stimulus from a testbench agent, wherein the input stimulus is generated and provided to the testbench agent by a user, and wherein the input stimulus is one of a directed stimulus or a corner-case stimulus.

3. The method of claim 1, further comprising:
   updating the reconfigurable internal buffer with a set of input stimulus for each of the plurality of DUT internal blocks based on a user requirement.

4. The method of claim 1, wherein the input stimulus corresponding to each of the plurality of DUT internal blocks is stored in a pre-configured input region of the reconfigurable internal buffer.

5. The method of claim 1, further comprising:
   transmitting, by each of the one or more DUT internal blocks, the corresponding output to a pre-configured output region of the reconfigurable internal buffer; and
   storing the corresponding output generated for each of the one or more DUT internal blocks in the pre-configured output region of the reconfigurable internal buffer.

6. The method of claim 5, further comprising:
   retrieving, for each of the one or more DUT internal blocks, the output stored in the corresponding pre-configured output region of the reconfigurable internal buffer; and
   verifying functionality of each of the one or more DUT internal blocks based on the retrieved output and a user requirement.

7. The method of claim 5, further comprising:
   comparing the output generated by each of the one or more DUT internal blocks with predefined expected values; and
   establishing whether the at least one test case has failed or passed, based on a result of the comparing.

8. The method of claim 1, wherein the set of configuration registers comprises an address register and a data register.

9. The method of claim 8, wherein the address register is configured with an address of a pre-configured input region or a pre-configured output region of the reconfigurable internal buffer, and wherein the data register is configured for writing the input stimulus to the pre-configured input region of the reconfigurable internal buffer or reading the corresponding output from the pre-configured output region of the reconfigurable internal buffer.

10. A system for simultaneously testing multiple Device Under Test (DUT) internal blocks, the system comprising:
    a processor; and
    a memory coupled to the processor, wherein the memory stores processor executable instructions, which, on execution, causes the processor to:
       receive, by a reconfigurable internal buffer of a DUT, an input stimulus corresponding to at least one of a plurality of DUT internal blocks within the DUT via a set of configuration registers, wherein the input stimulus corresponds to a test case;
       select, via a control register, one or more DUT internal blocks from the plurality of DUT internal blocks to perform testing based on the input stimulus, wherein, to select the one or more DUT internal blocks, the processor-executable instructions may further cause the processor to:
          enable via control bits, at least one multiplexer associated with the one or more DUT internal blocks;
       send, by the reconfigurable internal buffer and selectively route, via the control register through at least one multiplexer, to a DUT internal block of the one or more DUT internal blocks, at least one of:
          the input stimulus; or
          a DUT output generated by a preceding DUT internal block;
       test the one or more DUT internal blocks based on the corresponding input stimulus; and
       generate, by each of the one or more DUT internal blocks, a corresponding output in response to testing.

11. The system of claim 10, wherein the processor executable instructions further cause the processor to receive, by the set of configuration registers, the input stimulus from a testbench agent, wherein the input stimulus is generated and provided to the testbench agent by a user, and wherein the input stimulus is one of a directed stimulus or a corner-case stimulus.

12. The system of claim 10, wherein the processor executable instructions further cause the processor to update the reconfigurable internal buffer with a set of input stimulus for each of the plurality of DUT internal blocks based on a user requirement.

13. The system of claim 10, wherein the input stimulus corresponding to each of the plurality of DUT internal blocks is stored in a pre-configured input region of the reconfigurable internal buffer.

14. The system of claim 10, wherein the processor executable instructions further cause the processor to:
    transmit, by each of the one or more DUT internal blocks, the corresponding output to a pre-configured output region of the reconfigurable internal buffer; and
    store the corresponding output generated for each of the one or more DUT internal blocks in the pre-configured output region of the reconfigurable internal buffer.

15. The system of claim 14, wherein the processor executable instructions further cause the processor to:
    retrieve, for each of the one or more DUT internal blocks, the output stored in the corresponding pre-configured output region of the reconfigurable internal buffer; and
    verify functionality of each of the one or more DUT internal blocks based on the retrieved output and a user requirement.

16. The system of claim 14, wherein the processor executable instructions further cause the processor to:
    compare the output generated by each of the one or more DUT internal blocks with predefined expected values; and
    establish whether the at least one test case has failed or passed, based on a result of the comparing.

17. The system of claim 10, wherein the set of configuration registers comprises an address register and a data register.

18. The system of claim 10, wherein an address register is configured with an address of a pre-configured input region or a pre-configured output region of the reconfigurable internal buffer, and wherein a data register is configured for writing the input stimulus to the pre-configured input region of the reconfigurable internal buffer or reading the output from the pre-configured output region of the reconfigurable internal buffer.

19. A non-transitory computer-readable medium storing computer-executable instructions for simultaneously testing multiple Device Under Test (DUT) internal blocks, the stored instructions, when executed by a processor, cause the processor to perform operations comprises:
    receiving, by a reconfigurable internal buffer of a DUT, an input stimulus corresponding to at least one of a plurality of DUT internal blocks within the DUT via a set of configuration registers, wherein the input stimulus corresponds to a test case;
    selecting, via a control register, one or more DUT internal blocks from the plurality of DUT internal blocks to perform testing based on the input stimulus, wherein selecting the one or more DUT internal blocks comprises:
        enabling via control bits, at least one multiplexer associated with the one or more DUT internal blocks;
    sending, by the reconfigurable internal buffer and selectively routing, via the control register through at least one multiplexer, to a DUT internal block of the one or more DUT internal blocks, at least one of:
        the input stimulus; or
        a DUT output generated by a preceding DUT internal block;
    testing the one or more DUT internal blocks based on the corresponding input stimulus; and
    generating, by each of the one or more DUT internal blocks, a corresponding output in response to testing.

* * * * *